No. 716,734. Patented Dec. 23, 1902.
L. A. MILLER.
CISTERN FILTER.
(Application filed Sept. 10, 1902.)
(No Model.)
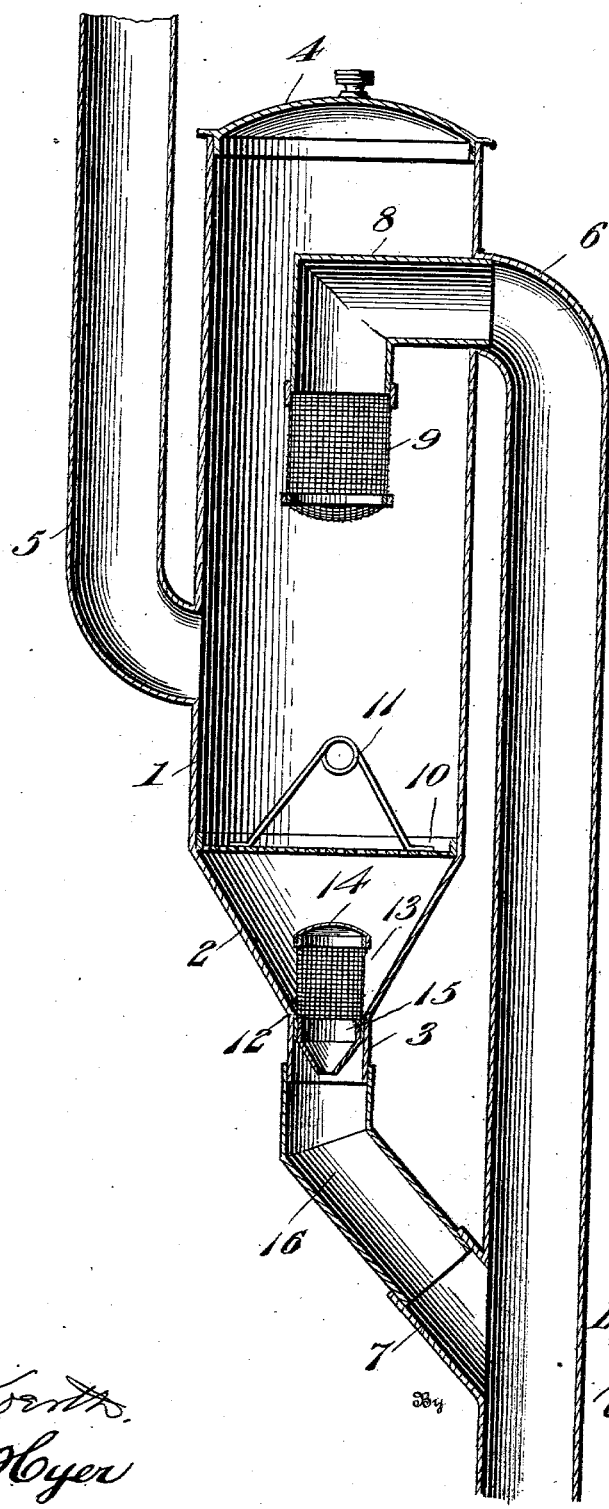
Witnesses
Inventor
Lafayette A. Miller
By
Victor J. Evans
Attorney

UNITED STATES PATENT OFFICE.

LAFAYETTE A. MILLER, OF MARION, OHIO.

CISTERN-FILTER.

SPECIFICATION forming part of Letters Patent No. 716,734, dated December 23, 1902.

Application filed September 10, 1902. Serial No. 122,844. (No model.)

*To all whom it may concern:*

Be it known that I, LAFAYETTE A. MILLER, a citizen of the United States, residing at Marion, in the county of Marion and State of Ohio, have invented new and useful Improvements in Cistern-Filters, of which the following is a specification.

This invention relates to cistern-filters in the form of strainers to relieve the rain-water flowing thereinto from leaves, twigs, and other sediment; and the object of the present improvement is to provide a simple and effective form of filter equipped with elements operating to clear the water flowing thereinto and delivering it into a cistern in proper condition for future use or directly into a receptacle or conveying device for immediate use, the parts of the improved filter being so arranged that they may be easily adjusted and separated for cleaning purposes and convenient in attachment to a spout and cistern and capable of being applied in any position desired between a spout and cistern.

The invention consists in the construction and arrangement of the several parts, which will be more fully hereinafter described and claimed.

The drawing illustrates a transverse vertical section of a filter embodying the features of the invention.

The numeral 1 designates an upright cylindrical chamber having a lower inverted-cone-shaped bottom 2, terminating in a collar 3, and an upper removable cap 4. Connected to the chamber at a point a short distance above the inverted-cone-shaped bottom 2 is an inflow-pipe 5, adapted to be attached to a rain-water spout or other means for conveying rain-water from a building or roof. At an opposite point the chamber 1 has an outflow-pipe 6 attached thereto near the upper end thereof, and at a suitable distance below the bottom 2 of said chamber the outlet-pipe has an upwardly-inclined connecting branch 7. Detachably secured to the upper end of the outlet-pipe and located within the chamber 1 is an outflow-elbow 8, having a screen or wire-gauze strainer 9 removably applied to the lower member thereof, the said strainer or screen 9 being located at a considerable elevation above the point of communication with the chamber 1 of the inflow-pipe 5. Removably mounted in the chamber and held in proper position by the formation of the inverted-cone-shaped bottom 2 is a flanged sheet-metal strainer 10, having an upstanding bail 11, whereby it may be conveniently removed or applied in operative position. A sleeve 12 is removably fitted within the collar 3 of the bottom 2 and has an upwardly-projecting strainer 13, preferably formed of wire-gauze material, with a closed sheet-metal cap 14 to prevent the water, draining through the screen 10, passing directly downwardly through the upper end of the strainer 13 with greater effectiveness in the straining operation. In the lower portion of the sleeve 12 an outflow-nozzle 15 is fitted to direct the water coming through the strainer 13 centrally in relation to the collar 3 and to a connecting-elbow 16, engaging the said collar 3 and the upwardly-extending branch 7 of the outflow-pipe 6. The collar 3 is long enough to permit the upper member of the elbow to be pushed upwardly thereon to disengage the lower end of the lower member of said elbow from the branch 7 and allow the said elbow 16 to be turned to one side and deflect the water draining through the screen 10 and passing through the strainer or screen 13, to be run off exteriorly of the filter, and in some instances this elbow 16 may be also used to carry away a surplus amount of water in the event that a cistern becomes filled or for other purposes. One great advantage of the use of the elbow 16 is that in some events where found necessary or desired a pipe may be attached thereto and convey the water away from the filter to any suitable distance desired.

The water, carrying branches, leaves, twigs, impurities, and sediment generally, flows through the pipe 5 into the chamber 1, and the heavier material, such as leaves and twigs, will collect upon the screen 10, and more or less of the sediment will also settle on the said screen, and the pure water rising in the cylinder will pass through the strainer 9 into the elbow 8 and from the latter into the outlet-pipe 6 to the cistern or other device to which said latter pipe may be attached. It will be seen that the water is further purified by passing through the strainer 9 and may be materially relieved of sediment, as the said strainer will be fine enough to arive at the result sought. The water draining through the screen 10 will pass through the screen or strainer 13 into the elbow 16 and from the latter into the pipe 6, and though the water coming through the screen 10 may be more or less contaminated by impurities in view of its passage through the accumulations on the said screen it will enter the outflow-pipe 6 in a purified condition owing to the interposition of the screen or strainer 13. As before explained, the elbow 16 may be turned to one side by disconnecting it from the branch 7 and cause the drain water passing through the screen 10 to be directed away from the filter.

The improved filter can be readily cleaned by removing the cap 4 and elbow 8 and drawing the screen 10 upwardly, and thereby remove all the accumulations disposed on the said screen. The chamber may be thoroughly washed, as well as the elbow and screen, and to facilitate running clean water through the chamber without obstruction the sleeve 12 and the parts carried thereby may also be withdrawn and the elbow 16 turned to one side to deliver the wash-water to a point exterior of the filter. By this means the several parts of the filter may be kept in good condition and rendered effective in performing the purifying operation for which they have been been designed without liability of clogging. The improved filter will be found exceptionally useful and can be easily applied in operative position, and to accommodate certain conditions, such as a large inflow of water, the proportions and dimensions of the several parts may be varied without departing from the principle of the invention.

Having thus fully described the invention, what is claimed as new is—

1. A filter of the class set forth, comprising an upright chamber having an inlet-pipe connected to a point above the bottom thereof, an outflow-pipe attached near the upper end thereof, an interiorly-located elbow removably attached to the outflow-pipe and having a depending strainer, and a removable screen in the lower part of the chamber below the connection with the latter of the inflow-pipe.

2. In a filter of the class set forth, the combination with an upright chamber having a removable cap and an inverted-cone-shaped bottom with a terminal collar, an inflow-pipe connecting with the chamber at a point adjacent to the bottom, an outflow-pipe attached to the chamber in the top of the latter and having an upwardly-extending branch below said filter, an elbow adjustably and movably engaging the collar of the bottom and the branch of the outflow-pipe, a strainer device removably mounted in the collar of the bottom, an elbow located within the chamber and removably attached to the outflow-pipe and having a depending terminal strainer, and a removable screen located in the chamber below the point of connection of the outflow-pipe therewith.

In testimony whereof I affix my signature in presence of two witnesses.

LAFAYETTE A. MILLER.

Witnesses:
W. E. SCOFIELD,
PATRICK J. MONAHAN.